United States Patent
Goel et al.

(10) Patent No.: US 10,644,947 B2
(45) Date of Patent: May 5, 2020

(54) NON-INVASIVE DIAGNOSIS OF CONFIGURATION ERRORS IN DISTRIBUTED SYSTEM

(71) Applicant: International Business Machines Corporation, Armonk, NY (US)

(72) Inventors: Seep Goel, Vasant Kunj (IN); Yu Gu, Austin, TX (US); Mudit Verma, Vasant Kunj (IN); Balaji Viswanathan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 36 days.

(21) Appl. No.: 16/144,258

(22) Filed: Sep. 27, 2018

(65) Prior Publication Data

US 2020/0106671 A1 Apr. 2, 2020

(51) Int. Cl.
*H04L 12/26* (2006.01)
*H04L 12/24* (2006.01)
(Continued)

(52) U.S. Cl.
CPC ...... *H04L 41/0869* (2013.01); *G06F 11/0709* (2013.01); *H04L 41/0631* (2013.01);
(Continued)

(58) Field of Classification Search
CPC ............. H04L 41/0869; H04L 41/0631; H04L 41/0618; H04L 43/065; H04L 43/0817; H04L 47/2441; G06F 11/0709
See application file for complete search history.

(56) References Cited

U.S. PATENT DOCUMENTS 5,377,196 A 12/1994 Godlew et al.
8,040,798 B2 10/2011 Chandra et al.
(Continued)

OTHER PUBLICATIONS

A. Whitaker et al., "Configuration Debugging as Search: Finding the Needle in the Haystack," Proceedings of the 6th Symposium on Operating Systems Design and Implementation (OSDI), USENIX Association, Dec. 6-8, 2004, pp. 77-90, vol. 6.
(Continued)

*Primary Examiner* — Minh Trang T Nguyen
(74) *Attorney, Agent, or Firm* — Ryan, Mason & Lewis, LLP

(57) ABSTRACT

Techniques for non-invasive diagnosis of configuration errors in distributed system are disclosed including obtaining data packets from a network that include inflows and outflows associated with a given component of the network. The number of inflows and the number of outflows for the given component of the network are determined based on the obtained data packets. An intersection point corresponding to a predetermined number of inflows and a predetermined number of outflows is obtained and a score for the given component is determined based on a relationship between the intersection point and the determined number of inflows and outflows for the given component. Whether the score for the given component is greater than a predetermined threshold is determined, and the given component is identified as having a configuration error in response to determining that the score for the given component is greater than a predetermined threshold.

21 Claims, 7 Drawing Sheets

(51) Int. Cl.
*H04L 12/851* (2013.01)
*G06F 11/07* (2006.01)
(52) U.S. Cl.
CPC ........ *H04L 41/0816* (2013.01); *H04L 43/065* (2013.01); *H04L 43/0817* (2013.01); *H04L 47/2441* (2013.01)

(56) References Cited

U.S. PATENT DOCUMENTS

| | | |
|---|---|---|
| 9,686,162 B2 | 6/2017 | Singh et al. |
| 2009/0052328 A1 | 2/2009 | Rentschler et al. |
| 2009/0185486 A1* | 7/2009 | Gerber .................... H04L 43/00 370/234 |
| 2012/0033567 A1* | 2/2012 | Yamada ................ H04L 45/125 370/252 |
| 2012/0173710 A1 | 7/2012 | Rodriguez |
| 2015/0341376 A1 | 11/2015 | Nandy et al. |
| 2018/0103091 A1* | 4/2018 | Kwak ................ H04L 41/5041 |

OTHER PUBLICATIONS

S. Kim et al., "Classifying Software Changes: Clean or Buggy?" IEEE Transactions on Software Engineering, Mar./Apr. 2008, pp. 181-196, vol. 34, No. 2.

Y. Gu et al., "Detecting Anomalies in Network Traffic Using Maximum Entropy Estimation," Proceedings of the 5th ACM SIGCOMM Conference on Internet Measurement (IMC), USENIX Association, Oct. 19-21, 2006, pp. 345-350.

* cited by examiner

NON-INVASIVE DIAGNOSIS OF CONFIGURATION ERRORS IN DISTRIBUTED SYSTEM

FIELD

The present application generally relates to information technology, and, more particularly, to diagnosing configuration errors in components of a network.

BACKGROUND

Most services have a distributed deployment with components, such as, e.g., servers, client devices, firewalls, routers, or other similar components, connected over a network. In some cases, service outages may occur within a network when one or more of the components is misconfigured. Such configuration errors in a network may often be hard to identify.

SUMMARY

In one embodiment of the present invention, techniques for non-invasive diagnosis of configuration errors in distributed systems are provided. An exemplary computer-implemented method can include steps of obtaining data packets from a network that includes inflows and outflows associated with a given component of the network. The number of inflows and the number of outflows for the given component of the network are determined based on the obtained data packets. An intersection point corresponding to a predetermined number of inflows and a predetermined number of outflows is obtained and a score for the given component is determined based on a relationship between the intersection point and the determined number of inflows and outflows for the given component. The method further includes determining whether the score for the given component is greater than a predetermined threshold and identifying the given component as having a configuration error in response to determining that the score for the given component is greater than the predetermined threshold.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Most services have a distributed deployment with components, such as, servers, client devices, firewalls, routers, or other similar components, connected over a network. In some cases, service outages may occur within a network when one or more of the components is misconfigured. Such configuration errors in a network may often be hard to identify. For example, while each component may have its own configuration, the root cause of a service outage may not be readily apparent by simply reviewing each component's configuration alone. For example, it may be impossible to know what is considered a "correct" configuration for an individual component. In some cases, the interactions between the configurations of two or more components may be the cause of the service outage while the individual components, on their own, may be considered to be configured correctly.

Figure 1:
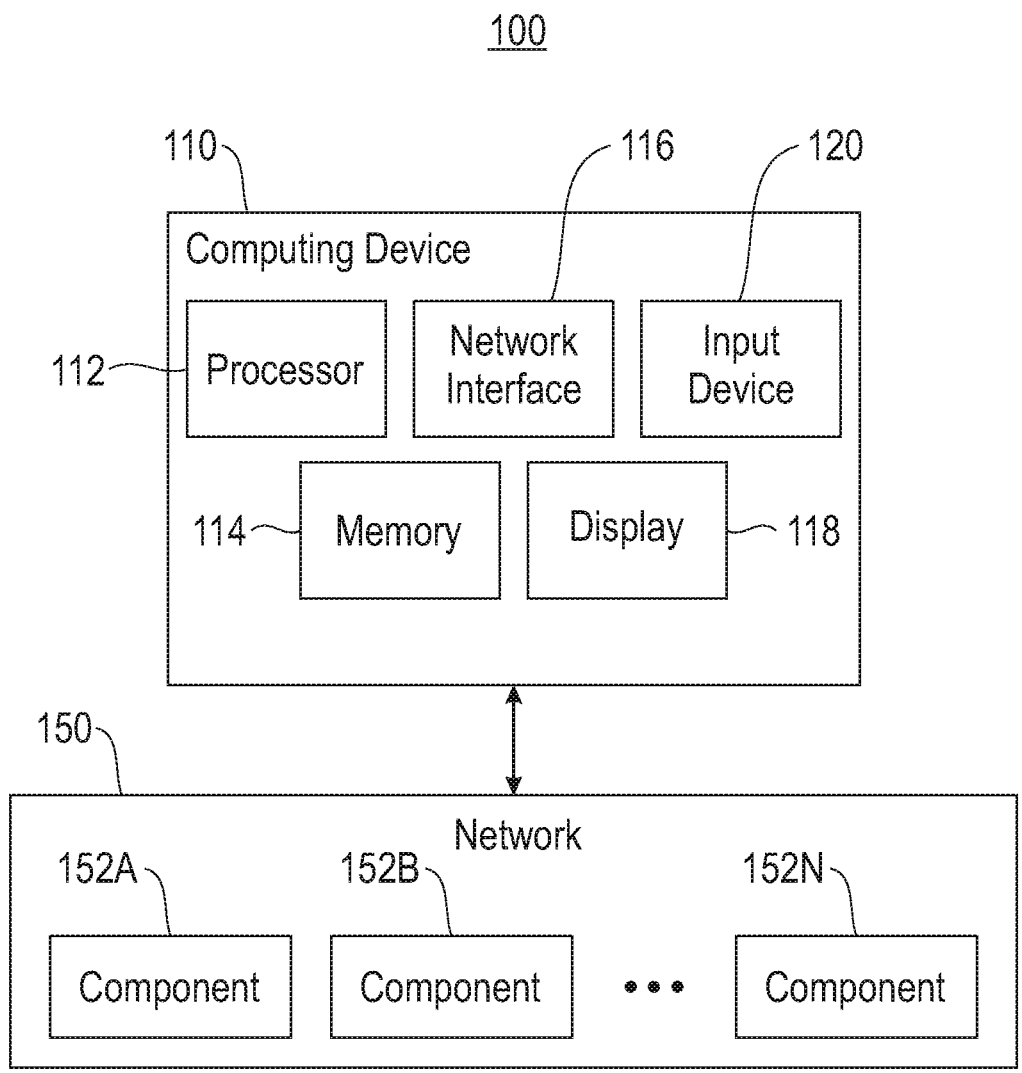
FIG. 1 is a diagram illustrating system architecture, according to an exemplary embodiment of the invention.

With reference now to FIG. 1, an embodiment of a system architecture 100 for non-invasive diagnosis of configuration errors in distributed system is illustrated. In some embodiments, system 100 includes a computing device 110, and a network 150.

Computing device 110 includes at least one processor 112, memory 114, at least one network interface 116, a display 118, an input device 120, and may include any other features commonly found in a computing device. In some embodiments, computing device 110 may include, for example, a personal computer, workstation, laptop, tablet, smart device, smart phone, smart watch, or any other similar computing device that may be used by a user.

Processor 112 may include, for example, a central processing unit (CPU), a microcontroller, Field Programmable Gate Array (FPGAs), or any other form of processing circuitry that is configured to perform various operations. Processor 112 may be configured to execute instructions as described below. These instructions may be stored, for example, in memory 114. As used herein, the term "processor" may include a single core processor, a multi-core processor, multiple processors located in a single device, or multiple processors in wired or wireless communication with each other and distributed over a network of devices, the Internet, or the cloud. Accordingly, as used herein, functions, features or instructions performed or configured to be performed by a processor may include the performance of the functions, features or instructions by a single core processor, may include performance of the functions, features or instructions collectively or collaboratively by multiple cores of a multi-core processor, or may include performance of the functions, features or instructions collectively or collaboratively by multiple processors, where each processor or core is not required to perform every function, feature or instruction individually.

Memory 114 may include, for example, computer readable media or computer readable storage media in the form of volatile memory, such as random-access memory (RAM) and/or cache memory or others. Memory 114 may include, for example, other removable/non-removable, volatile/non-volatile storage media. By way of non-limiting examples only, memory 114 may include a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing.

In some embodiments, computer software including instructions or code for performing the methodologies of the invention, as described herein, may be stored in associated memory 114 and, when ready to be utilized, loaded in part or in whole (for example, into RAM) and implemented by processor 112. Such software could include, but is not limited to, firmware, resident software, microcode, and the like. The memory 114 may include local memory employed during actual implementation of the program code, bulk storage, and cache memories which provide temporary storage of at least some program code in order to reduce the number of times code must be retrieved from bulk storage during implementation.

Network interface 116 is configured to transmit and receive data or information to and from a network 150 or any other server, component, or computing device via wired or wireless connections. For example, network interface 116 may utilize wireless technologies and communication protocols such as Bluetooth®, WIFI (e.g., 802.11a/b/g/n), cellular networks (e.g., CDMA, GSM, M2M, and 3G/4G/4G LTE), near-field communications systems, satellite communications, via a local area network (LAN), via a wide area network (WAN), or any other form of communication that allows computing device 110 to transmit or receive information to or from network 150 including components of network 150.

Display 118 may include any display device that is configured to display information to a user of computing device 110. For example, in some embodiments, display 118 may include a computer monitor, television, smart television, or other similar displays. In some embodiments, display 118 may be integrated into or associated with computing device 110, for example, as a display of a laptop, smart phone, smart watch, or other smart wearable devices, as a virtual reality headset associated with computing device 110, or any other mechanism for displaying information to a user. In some embodiments, display 118 may include, for example, a liquid crystal display (LCD), an e-paper/e-ink display, an organic LED (OLED) display, or other similar display technologies. In some embodiments, display 118 may be touch-sensitive and may also function as an input device 120.

Input device 120 may include, for example, a keyboard, a mouse, a touch-sensitive display 118, a keypad, a microphone, or other similar input devices or any other input devices that may be used alone or together to provide a user with the capability to interact with computing device 110.

Network 150 includes components 152A, 152B, . . . , 152N that are configured to communicate with each other to perform one or more services. Each component may include a processor, memory, and a network interface that may include similar functionality as processor 112, memory 114, and network interface 116. In some embodiments, each component 152A-N may comprise a computing device, server, or similar device or system that is configured transmit and receive data packets in the network 150.

IP traffic data between components of a network may be analyzed by capturing data packets at various points in a system. For example, a variety of IP network packet capture tools may be utilized to capture packets at a firewall, router, or other component of a network. In some embodiments, an IP network packet capture tool such as, e.g., Netflow™ developed by Cisco Systems, may be utilized to capture data packets in a network. The tool may, for example, utilize a standardized packet format which is supported by most or all of the components in the network such as, e.g., a CISCO® standardized packet format. In some embodiments, for example, where different packet formats are used by the components of a network, additional or alternative tools may be utilized to capture the data packets. The IP network packet capture tool may sample data packets, construct in-memory flow statistics, and export or log the flow statistics for later review. The tool may track data packet flow properties such as, e.g., source IP, source port, destination IP, destination port, protocol, flags, and other similar properties of a particular flow.

A non-limiting list of additional or alternative IP network packet capture tools that may be utilized to capture data packets may include, for example, Argus® developed by The Argus Project, Jflow™ developed by Juniper Networks, Cflowd™ developed by the Center for Applied Internet Data Analysis, NetStream® developed by Network Data Systems (NDS), Rflow™ developed by Real Solutions, AppFlow® developed by Citrix®, Traffic Flow™ developed by Micro-Tik, sFlow® developed by SFlow, or other similar tools.

In some embodiments, any of the IP network packet capture tools described above may be utilized to capture IP network data packets for network 150. In some embodiments, any other IP network packet capture tool may be utilized to capture IP network data packets for network 150.

In some embodiments, an IP network packet capture tool may collect or obtain log data associated with network 150 over a period of time. In some embodiments, for example, the period of time may be a predetermined period of time. In some embodiments, the period of time may be obtained from a user of the system, e.g., via input device 120, or it may be obtained in any other manner.

In some embodiments, the IP network packet capture tool may construct patterns of network traffic and flows among and between networked components. These components and their patterns and flows may be characterized based on the network characteristics.

In some embodiments, additional data about the components may be imported from alternative sources. The additional data about a component may include, for example, a date of provisioning, role, power state time series, aggregate bandwidth usage, or other similar data about a particular component. In some embodiments, the alternative sources may include, for example, one or more databases external to the network 150, non-network computing devices, non-network servers, or other similar sources. In some embodiments, the alternative sources may include one or more of the components of network 150 themselves. For example, where the IP network data packets may be captured by the tool at routers or other similar devices in the network 150, the additional data may be obtained directly from the service components themselves such as, e.g., servers, computing devices, or other similar devices that perform services.

In some embodiments, anomalous behavior may be identified, for example, based on component characteristics, based on flow characteristics, or based on similarity to past behavior, deviation from past behavior, or both, e.g., a trend.

In some embodiments, components with configuration errors leading to anomalous behavior may be identified, for example, based on a temporal trends and co-relation with other components. For example, data packets associated with interactions of a given component of the network with one or more other components of the network may be analyzed to determine if there is a trend in the co-relation of the given component with other components that indicates a potential configuration error or anomaly.

In some embodiments, closed loop verification and tracking of anomalous patterns may be used to determine whether a configuration change to a given component has fixed a configuration error. For example, the configuration fix may be performed manually to fix the given component, and the corresponding flow may be labeled for future tracking. In some embodiments, reinforced or supervised learning models may then utilize the labels to determine whether the configuration fix was successful, for example, by monitoring the labeled flows and corresponding IP network data packets related to the given component for further anomalous behavior. In some embodiments, a smoke test, e.g., fake flows or interactions, may be triggered in the given component to automate verification of the configuration fix.

In some embodiments, the network 150 and the components 152A-152N of the network 150 may include particular characteristics that may be analyzed to determine whether there is a configuration error. For example, a given component of the network 150, e.g., a server or other computing device, may have associated characteristics such as, e.g., number of inflows, number of outflows, total bandwidth used, and which other components are connected to the given component. A given flow or type of flow in the network 150, e.g., a communication between two or more components of the network 150, may include characteristics such as duration, volume of data transferred, frequency, and what flags are set.

When analyzing network packets that are captured by an IP network packet capture tool, various kinds of anomalous behavior patterns may be seen.

For example, in some cases, a communication flow may not complete, e.g., due to an invalid IP or port combination. In this case, for example, analysis of the network packets may show that only synchronization (SYN) packets are sent by a given component of network 150 and connection establishment or data packet transfer may or may not be dropped by a firewall. For example, the firewall may not execute or forward the packet to the next destination.

As another example, where a given flow has completed but the behavior of the flow has changed from prior instances of the flow, i.e., historical instances of the same flow or type of flow for that component, an anomaly may be detected. For example, if the given flow has a short duration or volume of data being transferred while the prior instance of the flow had a longer duration or higher volume of data being transferred, or vice versa, this may indicate that there is an anomaly for the given flow which may have been caused by a configuration error. As another example, if the timing of when the given flow occurred relative to the timing between prior instances of the flow, e.g., the frequency, has been reduced or increased, this may indicate that there is an anomaly for the given flow which may have been caused by a configuration error.

In some cases, for example, where a given flow is completed, but to an endpoint other than that defined, for example, by a policy of the network or service, this may indicate that an anomaly may be present. For example, if the network includes a satellite server in a local environment and a global satellite server that may perform the same service or function, the policy of the network may indicate that the local satellite server is preferable to the global satellite server as an endpoint. For example, the use of a local satellite server may reduce costs, reduce latency, or provide other similar advantages. If the given flow completes with an endpoint of the global satellite server instead of the local satellite server, this may indicate that an anomaly is present in the configuration of the component that is executing the flow.

In another case, for example, one component in a cluster of components may have flows that are different from other similar components in the cluster. In some embodiments, to make this determination, additional data may be required aside from the network packets. For example, if one worker node in a Hadoop® cluster is referring to a zookeeper server that the other worker nodes in the cluster do not refer to, this information may be utilized to identify a misconfiguration in the one worker node.

In an embodiment, network packet data may be utilized to assist in determining whether there are any misconfigurations in a network 150. For example, in some embodiments, the number of inflows and number of outflows for components 152A-152N of the network 150 may be obtained over a predetermined period of time and analyzed to determine whether there are potential misconfigurations for those components in the network 150. In some embodiments, the predetermined period of time may be a period of from the provisioning date of the component to a current time. In some embodiments, the predetermined period of time may be a time since the last configuration change of a component.

In some embodiments, the number of inflows and number of outflows for a given component may form a pair that may be used as a data point. For example, a given component that has 150 inflows and 120 outflows may have a data point of 150, 120.

Figure 2:
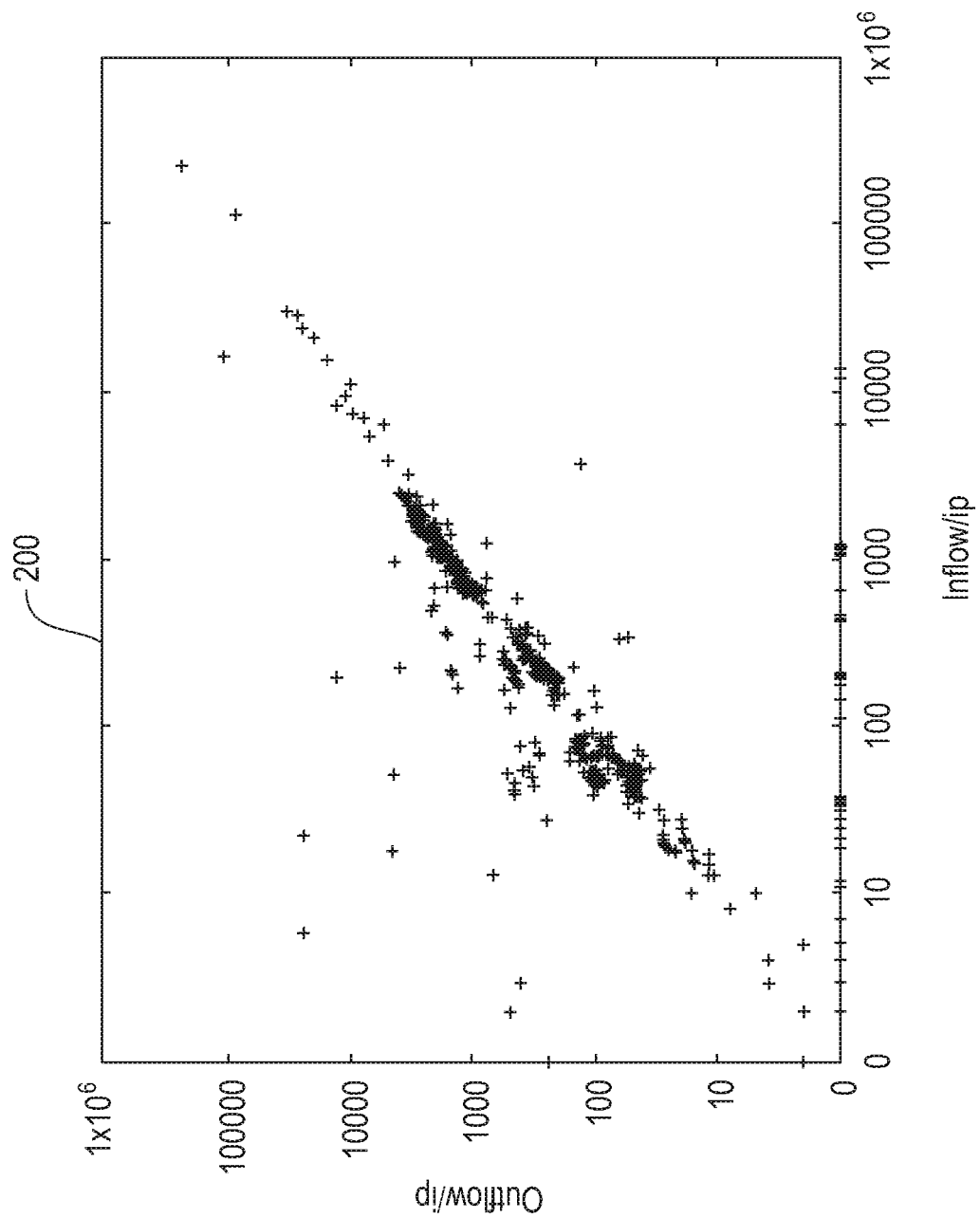
FIG. 2 is a diagram illustrating a plot of inflows vs outflows for components of a network, according to an exemplary embodiment of the invention.
Figure 3:
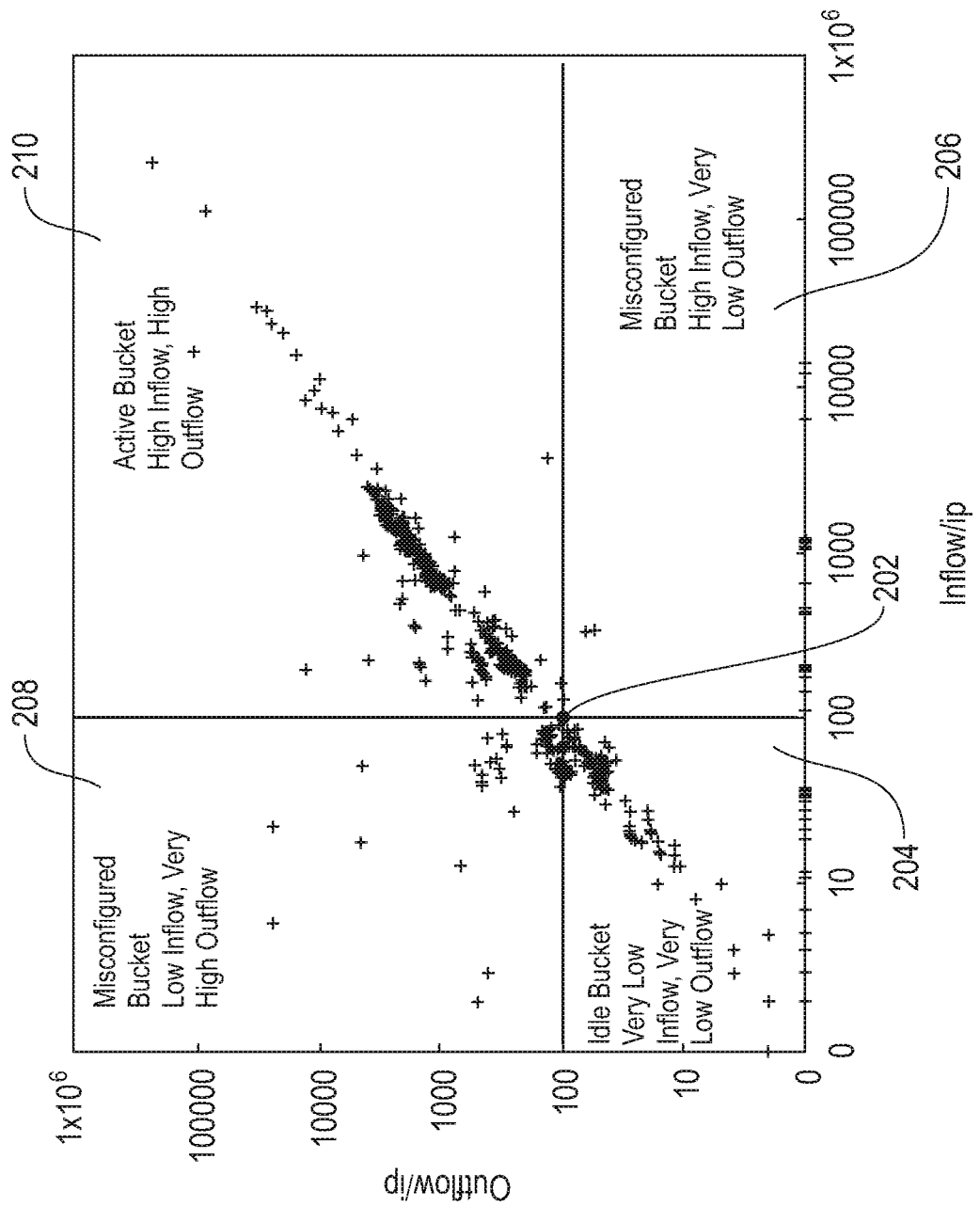
FIG. 3 is a diagram illustrating the plot of FIG. 2 including an intersection point and buckets, according to an exemplary embodiment of the invention.
Figure 4:
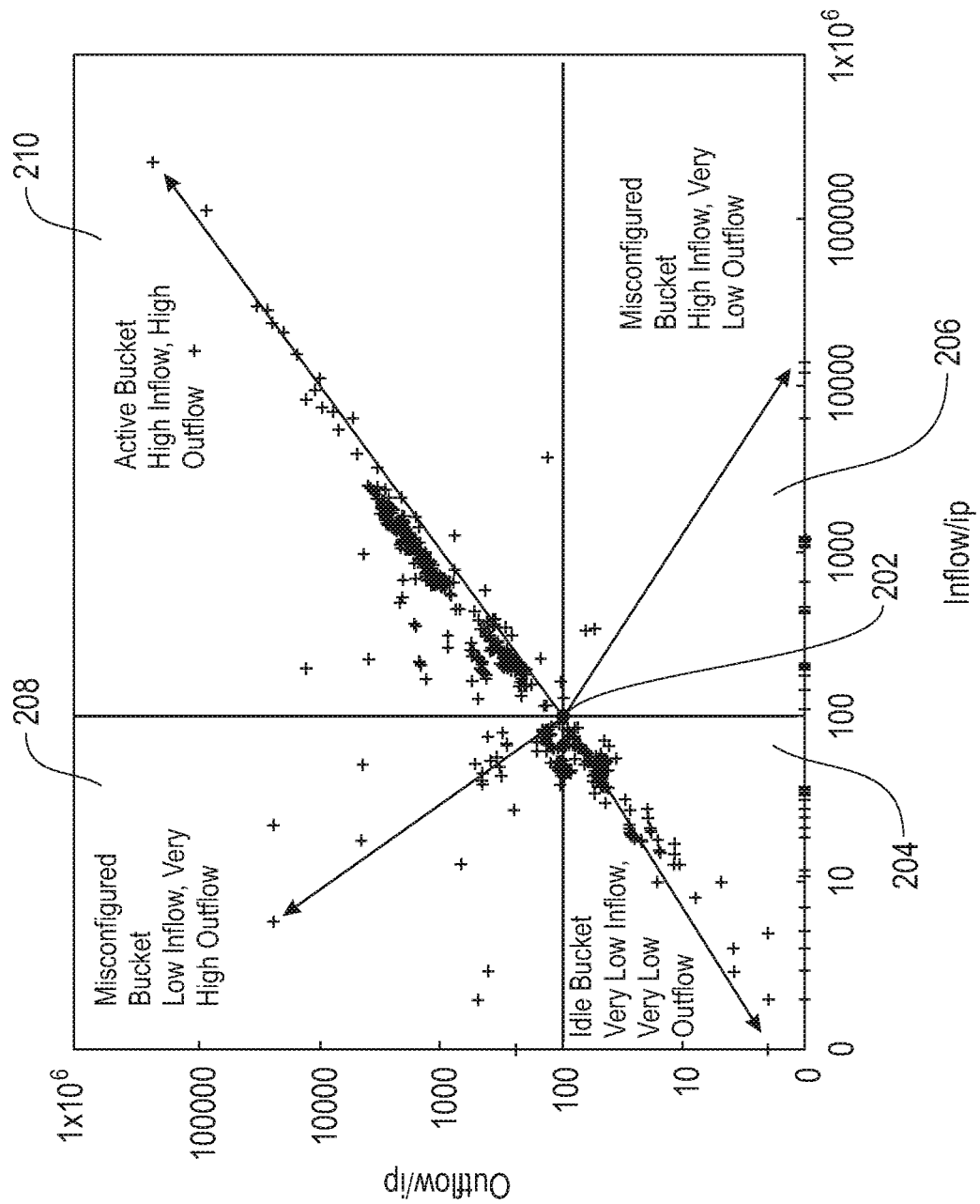
FIG. 4 is a diagram illustrating the plot of FIG. 3 including Euclidean distance vectors, according to an exemplary embodiment of the invention.

With reference now to FIGS. 2-4, for example, the data points of the components 152A-152N may be plotted. For example, as illustrated in FIG. 2, the number of inflows may be plotted against the number of outflows for each component 152A-152N to generate a plot 200.

With reference now to FIG. 3, in some embodiments, the plot 200 may be divided into buckets around an intersection point 202. In some embodiments, the intersection point 202 may be predetermined point. In some embodiments, the intersection point 202 may be set by a user of computing device 110, e.g., via input device 120. In some embodiments, for example, an intersection point 202 may be determined based on a manual analysis of the traffic patterns of the network over time. In some embodiments, machine learning techniques such as, e.g., clustering, may be employed to analyze the traffic patterns of the network and determine an intersection point 202. In some embodiments, the intersection point 202 may be determined based on a defined rule. As illustrated in FIG. 3, for example, the intersection point 202 may be 100, 100. In some embodiments, the intersection point 202 may be any point on the plot 200. For example, the intersection point 202 may be, e.g., 100, 100; 150, 150; 200, 200; 1000, 1000; 10,000, 10,000; 100, 200; 100, 300; or any other pair of inflow and outflow numbers. The number of inflows need not match the number of outflows at the intersection point 202.

In some embodiments, a first bucket 204 may comprise all components 152A-152N that have a number of inflows below the number of inflows at the intersection point 202 and a number of outflows below the number of outflows at the intersection point 202. The first bucket 204 may, for example, represent those components that have a low level of activity with low numbers of inflows and outflows relative to the intersection point 202.

In some embodiments, a second bucket 206 may comprise all components 152A-152N that have a number of inflows above the number of inflows at the intersection point 202 and a number of outflows below the number of outflows at the intersection point 202. The second bucket 206 may, for example, represent those components that have mismatched activity between inflows and outflows with more outflows than inflows.

In some embodiments, a third bucket 208 may comprise all components 152A-152N that have a number of inflows below the number of inflows at the intersection point 202 and a number of outflows above the number of outflows at the intersection point 202. The third bucket 208 may, for example, represent those components that have mismatched activity between inflows and outflows with more inflows than outflows.

In some embodiments, a fourth bucket 210 may comprise all components 152A-152N that have a number of inflows above the number of inflows at the intersection point 202 and a number of outflows above the number of outflows at the intersection point 202. The fourth bucket 210 may, for example, represent those components that have a high level of activity with high numbers of inflows and outflows relative to the intersection point 202.

While illustrated with four buckets 204-210 in FIG. 3, any other number of buckets may be used without departing from the scope of the present disclosure including, for example, no buckets, one bucket, two buckets, three buckets, five buckets, or any other number of buckets.

While illustrated as a plot 200 in FIGS. 2-4, in some embodiments, the data points may also or alternatively be stored in a data structure and analyzed without plotting.

With reference now to FIG. 4, the Euclidean distance between the intersection point 202 and the data point for each component may be determined as a score for that component. For example, a data point having a longer Euclidean distance from the intersection point 202 will have a higher score than a data point having a shorter Euclidean distance from the intersection point 202. For example, if the points (x 1, y 1) and (x 2, y 2) are in 2-dimensional space, then the Euclidean distance between them is SqRoot{(x 2−x 1)^2+(y 2−y 1)^2}.

Using Euclidean distance as the basis for a score for a component allows outlier components having large Euclidean distances from the intersection point 202, e.g., high scores, to be identified, e.g., due to large mismatches in inflows and outflows, very large levels of inflows and outflows, or very low levels of inflows and outflows, while components having low scores may be disregarded, e.g., those components that have relatively matched numbers of inflows and outflows with the numbers being relatively close to the intersection point 202. In some embodiments, for example, the components with the top 5 scores, e.g., 5 longest Euclidean distances, may be targeted for further analysis or action.

In some embodiments, the determined scores for each component may be compared to a predetermined threshold where, for example, scores above the predetermined threshold may indicate that a given component may have a configuration error. In some embodiments, for example, the predetermined threshold may be 100 where any distances above the predetermined threshold of 100 may be considered abnormal. Any other predetermined threshold may be used. For example, the predetermined threshold may be obtained from a user, e.g., via input device 120, determined in view of an analysis of the traffic patterns in the network or in any other manner. In a non-limiting example, the components with the five largest Euclidean distances above the predetermined threshold may be considered abnormal. Any other number of components having distances above the predetermined threshold may be considered abnormal.

In some embodiments, an alert may be raised in response to a detection of abnormalities in one or more components, e.g., based on their Euclidean distances being greater than the predetermined threshold, being in the top 5 number of largest Euclidean distances, or both. Corrective action may then be taken by the system. In some embodiments, for example, the corrective action may be taken automatically by the system in response to an alert. In some embodiments, an administrator of the system may review the alert and analyze the component to determine whether the abnormality is indicative of a configuration error in that component.

In some embodiments, the analysis of the data points may be extended to an N dimensional Eigen vector. For example, where the determination of Euclidean distance is described above with respect to a two dimensional plane, i.e., inflow and outflow, other factors may also be considered including, for example, inflow, outflow, latency, bandwidth, etc., which would increase the number of dimensions. For example, inflow, outflow, latency, and bandwidth may be a four dimensional plane in which the distance between points in four dimensions, e.g., an Eigen vector, may be used to determine whether there are any abnormalities in a similar manner to the Euclidean distance in two dimensions described above.

In some embodiments, computing device 110 may automatically trigger corrective action for those components having scores above the predetermined threshold, the top N scores, or both, e.g., automatic configuration updates, requesting manual configuration updates, flagging the component for a configuration update, transmitting an indication of a configuration error, restarting a service, re-routing network traffic around the abnormal component to a backup service, or other similar action.

When such a corrective action has been executed, the network packets associated with that component may be monitored in the manner described above to determine whether the configuration error is still present and whether the configuration update has any effect on other components in the network 150.

The above disclosed techniques identify at least some misconfigured components in a network without requiring access to configuration files or other knowledge of the component itself. These techniques are non-intrusive and do not require any additional operation or action by the components themselves to provide information to the computing device 110, which preserves computing resources and efficiency in the network. For example, as described above, the network packets may be obtained by an IP network packet capture tool during the normal course of operation and may be analyzed to identify the number of inflows and outflows for each component 152A-152N of the network 150. The number of inflows and outflows for a particular component may be used as a paired data point and the Euclidean distance of that data point to an intersection point may be used to determine a score for that component. A score above a predetermined threshold may indicate a potential configuration error and may trigger corrective action. The disclosed techniques do not require an agent or footprint on the component or other endpoint, are easy to deploy, and are non-intrusive.

In another embodiment, each component in the network may have an associated blame value that may be attributed to the component for potential configuration errors. For example, computing device 110 may store a data structure or other construct, e.g., an array, which tracks blame values for each component. In some embodiments, the blame values may be stored in another location on the network.

In some embodiments, for example, the blame value for each component may be initialized to a predetermined value, e.g., 0. In some embodiments, after a corrective action is taken on a component, the blame value for that component may be reset, e.g., back to the predetermined initialization value. In some embodiments, the blame value for a component may be reset to the predetermined initialization value or decremented after a predetermined period of time in which the blame value is not incremented.

In this embodiment, IP network data packets may be obtained as described above using an IP network packet capture tool and may be analyzed to determine whether any components are only receiving or only transmitting packets in particular flows. For example, if only SYN packets are being transmitted or received in a flow between two or more components, this may indicate that there is a configuration error on one or more of the components. For example, this situation may indicate that there is no service on a particular port associated with the flow on one or more of the components.

When such a situation occurs, for example, a blame value may be assigned to both the component that received the SYN packets, and the component that transmitted the SYN packets for that flow. For example, a blame value associated with each component may be initialized or incremented. As additional IP network data packets are transmitted and received in the network, blame values may be accumulated on some components from similar flows, e.g., all clients to same server/port, to identify the components, e.g., clients, servers, firewalls, or other similar components, that have configuration errors. For example, if a given component is only transmitting SYN packets to, or receiving SYN packets from, other components without taking any other action for those SYN packets, the blame value for the given component may be incremented for each flow that only transmits or receives the SYN packets. When the blame value for the given component is incremented above a predetermined threshold, this may indicate that that the given component has a configuration error.

In some embodiments, short lived flows may be used to identify a component having a configuration error. Short lived flows may, for example, result from application connection issues between components. In some embodiments, for example, a trend of the flow or other similar flows may be identified, e.g., based on historical information about that flow or matching characteristics to other flows. The trend may be identified, for example, based on flow information collected over time by the IP network packet capture tool. In some embodiments, the trend may be identified based on other data obtained from other sources.

In an illustrative example, if the trend of the flow or of similar flows is to be long lived flow, e.g., database sessions such as login, query, read responses, etc., but the current flow of the same or similar type is short lived, this may indicate a configuration error. For example, if a component periodically connects to another component to execute some program and this process typically takes about 15 minutes, but the periodic connection between the two components has now dropped to only a few seconds, this may indicate an abnormal condition in one or both of the components. An alarm may be raised in response to such a dramatic change in the time of the periodic connection because this change is not normal. Affected components such as, e.g., servers, may see short term connections to other components, e.g., database server, port, etc. which may indicate that there is a connection issue. In an illustrative example, the username or password for a user associated with the flow may be expired or have been locked out which may cause the application connections to be refused by one or more components of the network, e.g., servers, databases, or other similar components. While short lived and long lived are relative terms described above with respect to particular times, these terms are not limited to the above described amounts of time. For example, in some embodiments, short lived may be any time that is smaller than a long lived time as may exist in the system and vice versa.

In some embodiments, supervised or unsupervised machine learning may be trained using multiple network characteristics. For example, clustering may be used to identify components having similar properties or activities. For example, a machine learning model may be trained using data including, e.g., inflows, outflows, active sessions, time since the service is up, or other similar inputs. The machine learning model may be configured to output, for example, clusters or groups of components that are exhibiting similar behavior where, for example, outlier components that are acting in an abnormal manner may receive a small or individual cluster or grouping and may be easily identifiable based on the clustering or grouping.

The techniques described herein may be used to identify mis-configurations in components of a network without directly accessing the configuration files, software, or other knowledge of the components. For example, by using IP network data packets obtained by an IP network packet capture tool, configuration issues in the components of the network may be identified in a non-invasive manner that does not tax the processing resources of the system.

In addition, other sources of data in addition to the IP network packet data may be incorporated to allow the assignment of a blame value to particular components which exhibit anomalous behavior. Some examples of additional data include scalable language application programming interfaces (SL APIs), logging and monitoring of metric data, logging, monitoring, and alerting (LMA) service alerts, or other sources of data.

Figure 5:
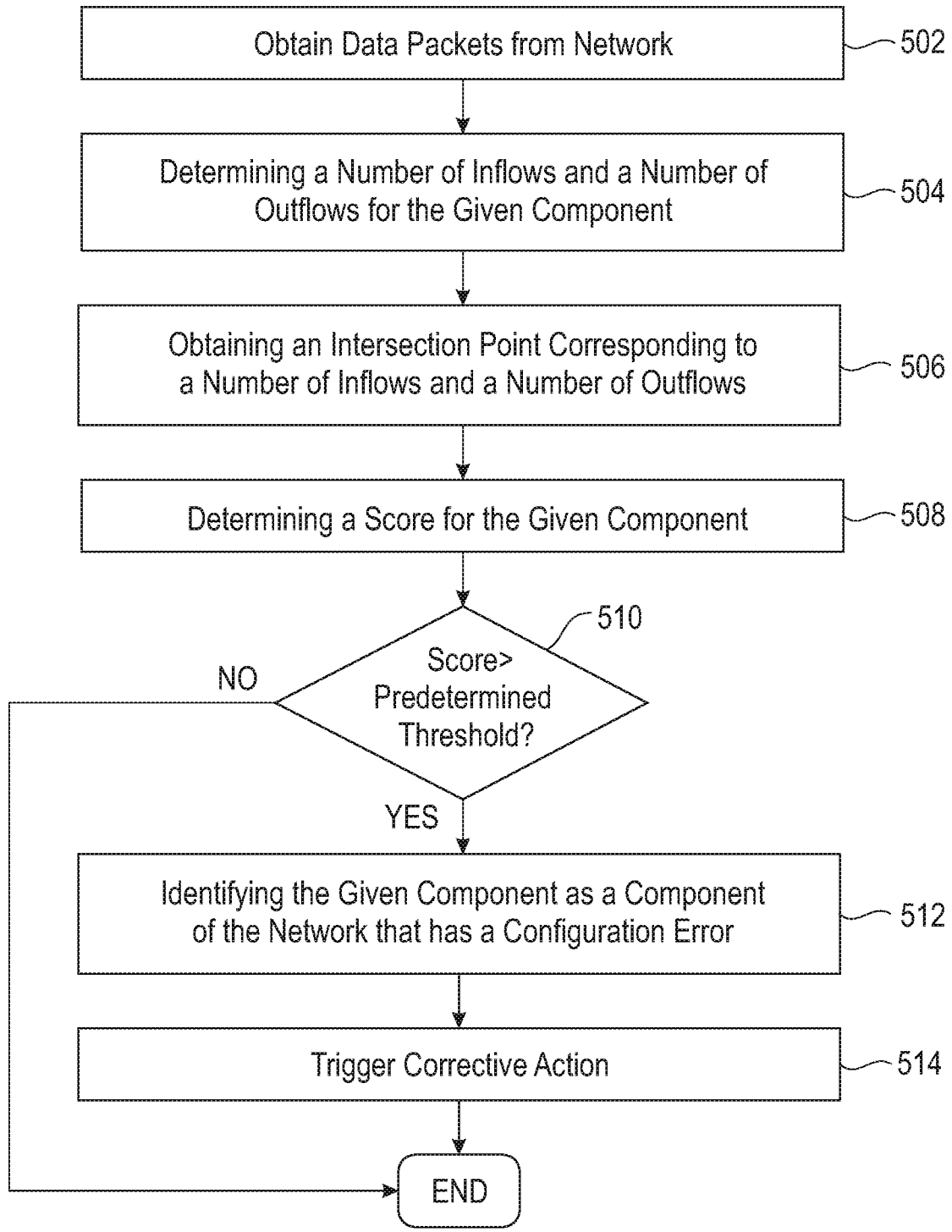
FIG. 5 is a flow diagram illustrating techniques according to an embodiment of the invention.

FIG. 5 is a flow diagram illustrating a method according to an illustrative embodiment.

At 502, data packets are obtained from the network 150 by computing device 110, for example, using one or more of the IP network packet capture tools described above. The obtained data packets may include inflows and outflows associated with a given component of the network.

At 504, computing device 110 determines a number of inflows and a number of outflows for the given component of components 152A-152N of the network 150 based on the obtained data packets. In some embodiments, the number of inflows and outflows may be provided by the IP network packet capture tool.

At 506, computing device 110 obtains an intersection point corresponding to a number of inflows and a number of outflows. For example, in some embodiments, the intersection point may be predetermined and stored in computing device 110 or on the network 150. In some embodiments, the intersection point may be obtained from a user input, e.g., via input device 120.

At 508, computing device 110 determines a score for the given component based on a relationship between the intersection point and the determined number of inflows and outflows for the given component. For example, in some embodiments, the relationship may be a Euclidean distance, Eigen vector or other similar relationship between the intersection point and a data point defined by the number of inflows, outflows, or other similar inputs (parameters) for the given component.

At 510, computing device 110 determines whether or not the score for the given component is greater than a predetermined threshold. If the score is not greater than a predetermined threshold, the method ends, otherwise the method proceeds to step 512.

At 512, computing device 110 identifies the given component as having a configuration error in response to determining that the score for the given component is greater than a predetermined threshold.

At 514, computing device 110 triggers a corrective action, for example, automatically, for the given component in response to the identification of the given component as having a configuration error. In some embodiments, for example, the corrective action may include an update to the configuration of the given component.

The techniques depicted in FIG. 5 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 5 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 112.

Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
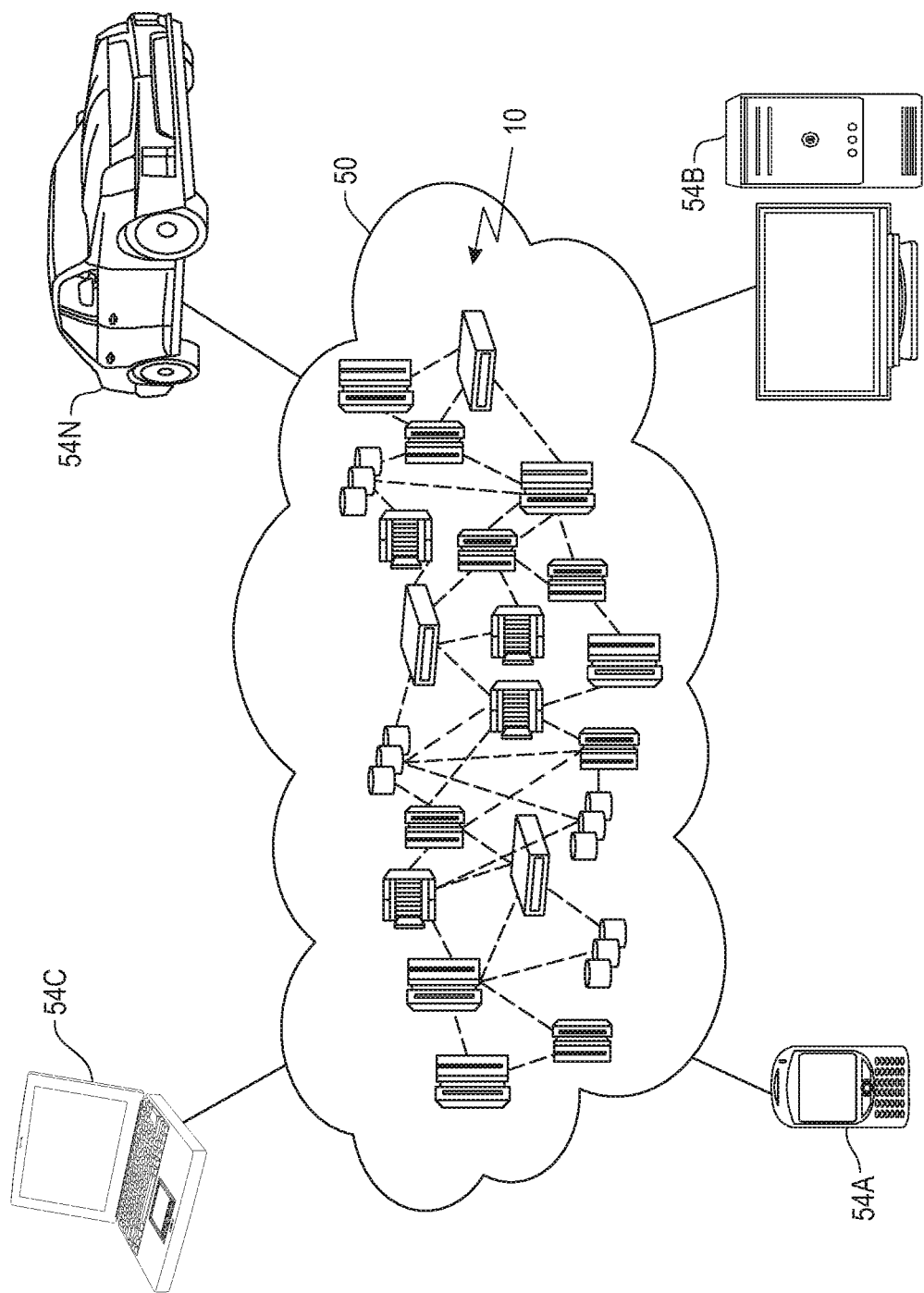
FIG. 6 depicts a cloud computing environment according to an embodiment of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
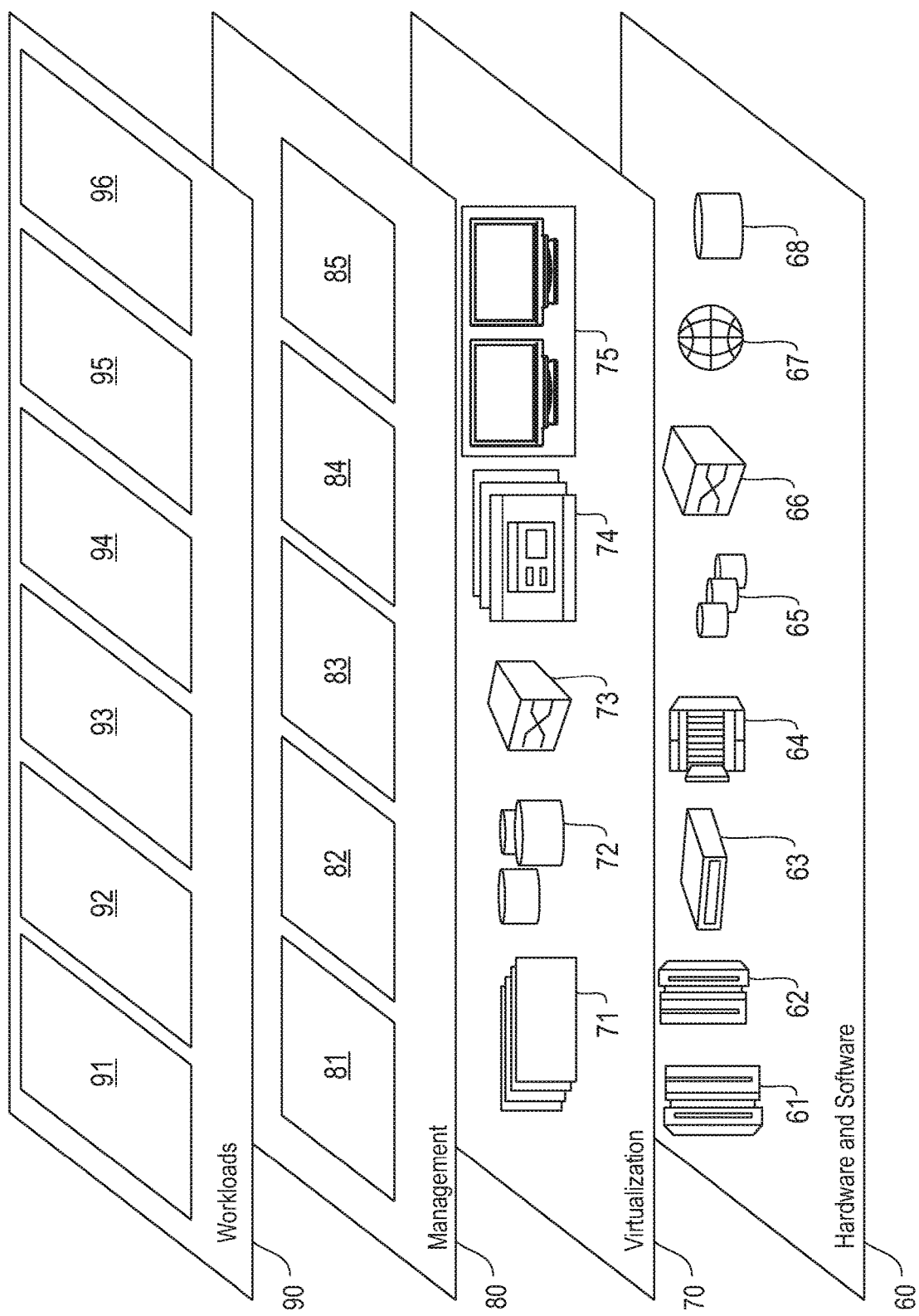
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and non-invasive diagnosis of configuration errors in distributed systems 96.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising steps of:
   obtaining data packets from a network, the data packets comprising inflows and outflows associated with a given component of the network;
   determining (i) the number of inflows and (ii) the number of outflows for the given component of the network based on the obtained data packets;
   obtaining an intersection point corresponding to (i) a predetermined number of inflows and (ii) a predetermined number of outflows;
   determining a score for the given component based on a relationship between (i) the intersection point and (ii) the determined number of inflows and outflows for the given component;
   determining that the score for the given component is greater than a predetermined threshold; and
   identifying the given component as having a configuration error, in response to determining that the score for the given component is greater than the predetermined threshold,
   wherein the steps are carried out by at least one computing device.

2. The computer-implemented method of claim 1, wherein the relationship is a Euclidean distance from the intersection point to a data point defined by the determined number of inflows and outflows for the given component.

3. The computer-implemented method of claim 1, wherein the relationship is an N dimensional eigen vector from the intersection point to a data point based on (i) the determined number of inflows and outflows for the given component and (ii) at least one additional dimension.

4. The computer-implemented method of claim 1,
   wherein the obtained data packets comprise inflows and outflows for a plurality of components of the network including the given component; and
   wherein said determining (i) the number of inflows and (ii) the number of outflows for the given component of the network based on the obtained data packets comprises determining a number of inflows and a number of outflows for each component of the network based on the obtained data packets.

5. The computer-implemented method of claim 4,
   wherein a blame value is associated with each component of the network, and wherein the method comprises:
   updating the blame value associated with (i) a first component of the network and (ii) a second component of the network in response to a detection of at least one abnormal condition associated with the first component and the second component based on the obtained data packets;
   determining that the updated blame value associated with at least one of the first and second components is greater than a predetermined threshold; and
   identifying the at least one of the first and second components as having a configuration error in response to determining that the updated blame value associated with the at least one of the first and second components is greater than the predetermined threshold.

6. The computer-implemented method of claim 5, wherein the blame value associated with the first component is increased in response to each detection of an abnormal condition associated with the first component.

7. The computer-implemented method of claim 5, comprising:
   detecting the at least one abnormal condition by determining, based on the obtained data packets, that data packets transmitted between the first component and the second component only flow in a single direction.

8. The computer-implemented method of claim 4, comprising:
   detecting a flow having a first duration based on the obtained data packets, the flow associated with a first component of the network;
   comparing the first duration to a second duration of a prior instance of the detected flow;
   determining, based on the comparison, that the first duration does not correspond to the second duration; and
   identifying the first component as having a configuration error in response to determining that the first duration does not correspond to the second duration.

9. The computer-implemented method of claim 1, comprising:
   automatically triggering a corrective action for the given component in response to the identification of the given component as having a configuration error.

10. The computer-implemented method of claim 9, wherein the corrective action comprises an update to the configuration of the given component.

11. A computer program product comprising a computer readable storage medium having program instructions embodied therewith, the program instructions executable by a computing device to cause the computing device to:
    obtain data packets from a network, the data packets comprising inflows and outflows associated with a given component of the network;
    determine (i) the number of inflows and (ii) the number of outflows for the given component of the network based on the obtained data packets;
    obtain an intersection point corresponding to (i) a predetermined number of inflows and (ii) a predetermined number of outflows;
    determine a score for the given component based on a relationship between (i) the intersection point and (ii) the determined number of inflows and outflows for the given component;
    determine that the score for the given component is greater than a predetermined threshold; and
    identify the given component as having a configuration error in response to determining that the score for the given component is greater than the predetermined threshold.

12. The computer program product of claim 11, wherein the relationship is a Euclidean distance from the intersection point to a data point defined by the determined number of inflows and outflows for the given component.

13. The computer program product of claim 11, wherein the relationship is an N dimensional eigen vector from the intersection point to a data point based on (i) the determined number of inflows and outflows for the given component and (ii) at least one additional dimension.

14. The computer program product of claim 11,
    wherein the obtained data packets comprise inflows and outflows for a plurality of components of the network including the given component; and
    wherein determining (i) the number of inflows and (ii) the number of outflows for the given component of the network based on the obtained data packets comprises determining a number of inflows and a number of outflows for each component of the network based on the obtained data packets.

15. The computer program product of claim 14, wherein a blame value is associated with each component of the network, and wherein the program instructions are executable by a computing device to cause the computing device to:
update the blame value associated with (i) a first component of the network and (ii) a second component of the network in response to detection of at least one abnormal condition associated with the first component and the second component based on the obtained data packets;
determine that the updated blame value associated with at least one of the first and second components is greater than a predetermined threshold; and
identify the at least one of the first and second components as having a configuration error in response to determining that the updated blame value associated with the at least one of the first and second components is greater than the predetermined threshold.

16. The computer program product of claim 15, wherein the blame value associated with the first component is increased in response to each detection of an abnormal condition associated with the first component.

17. The computer program product of claim 15, the program instructions further executable by a computing device to cause the computing device to:
detect the at least one abnormal condition by determining, based on the obtained data packets, that data packets transmitted between the first component and the second component only flow in a single direction.

18. The computer program product of claim 14, the program instructions further executable by a computing device to cause the computing device to:
detect a flow having a first duration based on the obtained data packets, the flow associated with a first component of the network;
compare the first duration to a second duration of a prior instance of the detected flow;
determine, based on the comparison, that the first duration does not correspond to the second duration; and
identify the first component as having a configuration error in response to determining that the first duration does not correspond to the second duration.

19. The computer program product of claim 11, the program instructions further executable by a computing device to cause the computing device to automatically trigger a corrective action for the given component in response to the identification of the given component as having a configuration error.

20. A system comprising:
a memory; and
at least one processor operably coupled to the memory and configured for:
obtaining data packets from a network, the data packets comprising inflows and outflows associated with a given component of the network;
determining (i) the number of inflows and (ii) the number of outflows for the given component of the network based on the obtained data packets;
obtaining an intersection point corresponding to (i) a predetermined number of inflows and (ii) a predetermined number of outflows;
determining a score for the given component based on a relationship between (i) the intersection point and (ii) the determined number of inflows and outflows for the given component;
determining that the score for the given component is greater than a predetermined threshold; and
identifying the given component as having a configuration error, in response to determining that the score for the given component is greater than the predetermined threshold.

21. A computer-implemented method, the method comprising steps of:
obtaining data packets from a network, the data packets comprising inflows and outflows associated with a plurality of components of the network, each component of the network having a corresponding blame value;
determining (i) the number of inflows and (ii) the number of outflows between (i) a first component of the network and (ii) a second component of the network based on the data packets;
detecting at least one abnormal condition corresponding to the determined (i) number of inflows and (ii) number of outflows between the first and second components;
updating the blame values associated with (i) the first component and (ii) the second component, in response to the detection of the at least one abnormal condition;
determining that the updated blame value associated with at least one of the first and second components is greater than a predetermined threshold; and
identifying the at least one of the first and second components as having a configuration error, in response to determining that the updated blame value associated with the at least one of the first and second components is greater than the predetermined threshold,
wherein the steps are carried out by at least one computing device.

* * * * *